2 Sheets--Sheet 1.

JAMES D. WILLOUGHBY.

Improvement in Seed-Planters.

No. 4,952. Reissued June 18, 1872.

Witnesses:

T. C. Brecht.

A. McCallum

Inventor,

J. D. Willoughby

A.M. PHOTO-LITHOGRAPHIC CO. N.Y. (OSBORNE'S PROCESS.)

2 Sheets--Sheet 2.

JAMES D. WILLOUGHBY.

Improvement in Seed-Planters.

No. 4,952. Reissued June 18, 1872.

Witnesses:

T. C. Brecht.

A. McCallum

Inventor:

J. D. Willoughby

AM. PHOTO-LITHOGRAPHIC CO. N.Y. (OSBORNE'S PROCESS.)

UNITED STATES PATENT OFFICE.

JAMES D. WILLOUGHBY, OF WASHINGTON, DISTRICT OF COLUMBIA.

IMPROVEMENT IN SEED-PLANTERS.

Specification forming part of Letters Patent No. 19,222, dated January 26, 1858; extended seven years; reissue No. 4,952, dated June 18, 1872.

SPECIFICATION.

*To all whom it may concern:*

Be it known that I, JAMES D. WILLOUGHBY, of the city of Washington, District of Columbia, have invented certain new and useful Improvements in Seed-Planters, which are certain and effective in operation, simple in construction, and durable in use; and consist in the use of rubber or other elastic material or spring, and in the combination of devices used with the same to hold the drill-teeth in proper position while being used, unless said teeth come in contact with some unyielding obstruction, when the drill-teeth will themselves yield until the obstruction is passed and then assume their proper position; also, in the use of rubber or other elastic substance for a roll or rollers, to give a regular feed to the seed planted, and to allow the same to pass between the rollers without being damaged or crushed, said rollers being placed on a horizontal plane to each other in the bottom of the hopper or beneath the same, as desired; also, in the construction and combination of the various parts, as hereinafter more fully described and pointed out by the claims; and I do hereby declare that the following is a full, clear, and exact description of the same, which will enable others skilled in the art to which it appertains to make and use the same, reference being had to the accompanying drawing, with letters of reference marked thereon forming a part of this specification, in which—

Figures 1, 3:
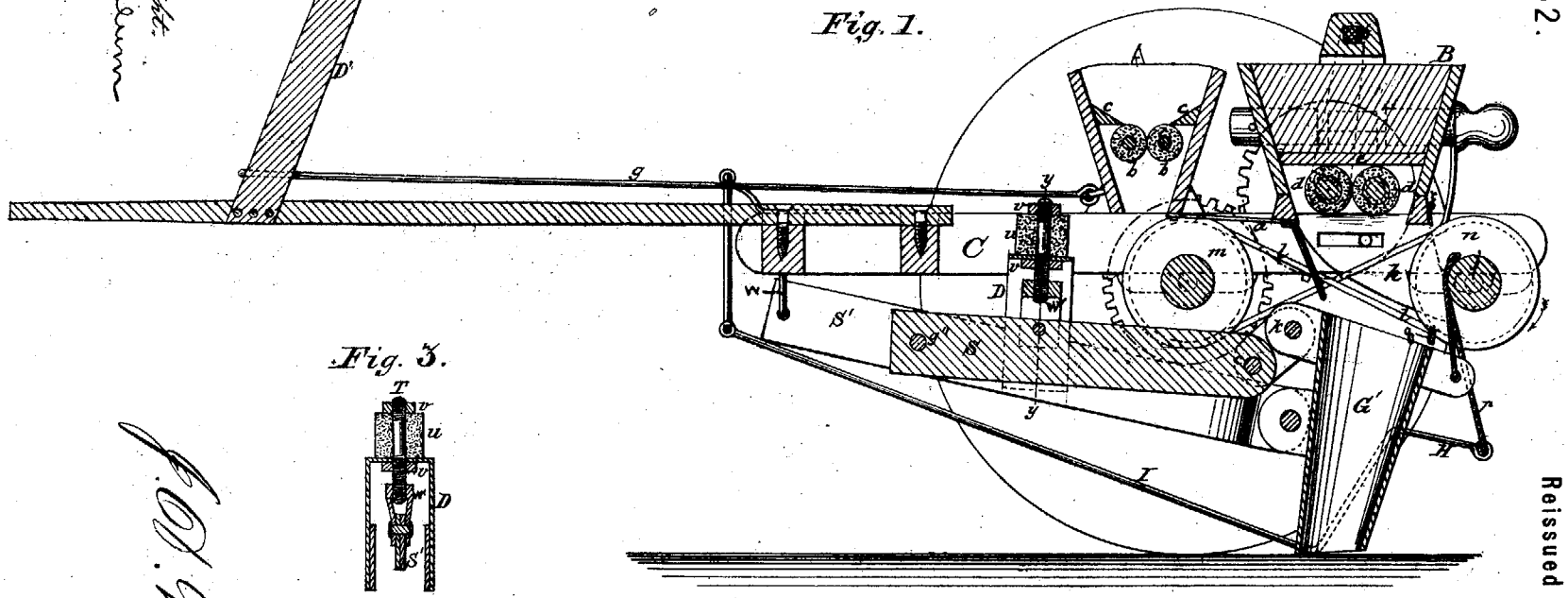
Figure 2:
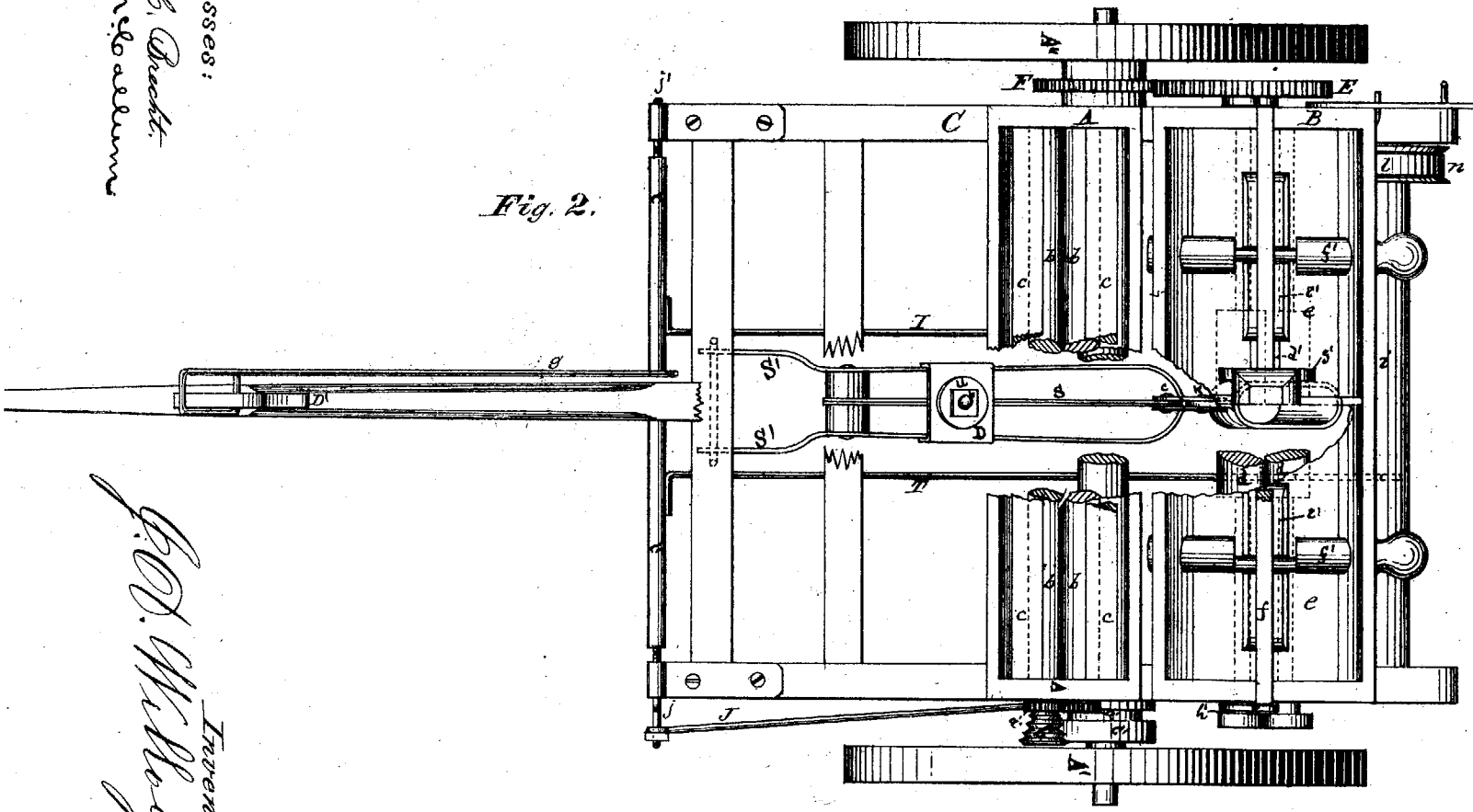

Figure 1 is a longitudinal section of a machine embodying my invention. Fig. 2 is a top or plan view of the same, with portions of the hoppers broken away to partially show the dropping-rollers; and Fig. 3 is a transverse vertical section of the drag-bars and spring device taken through line *y y* of Fig. 1.

In the drawing, A B represent the hoppers, which are pivoted to the frame C, at the end opposite the gearing, by bolt or otherwise, so as to be movable about said connection, and the said hoppers are fastened together at the gearing end by means of the rod or strap *a*, so that the hoppers shall be movable together. The front hopper A is provided on the inside with angular blocks *c c*, so arranged as to guide the seed or grain between the rollers *b b*, said rollers being placed lengthwise of the hopper, and the shafts, upon which the rollers are placed, are fitted in suitable journals in each end of the hopper A. Each of said shafts extend beyond one end of the hopper, and are provided with pinions *a′ a′*, and one of said shafts is provided with a gauge band-pulley, *b′*, by which the speed of the rollers *b b* may be regulated through the medium of a band and band-wheel, *c′*, attached to the wheel A′ or to the axle. The hopper B is made or divided into two divisions, and in the bottom of each there is a slot, *d′*, for the passage of the seed and fertilizer, the size of said slot or opening being regulated by the slides *e′ e′*, which are operated by the shafts *f′ f′* passing through the hopper and having eccentrics, as shown. The rod F extends over the hopper B, and has depending arms or stirrers *g′* vibrated by the motion of the rod *f*, produced by the connection with eccentric *h′* on the shaft of one of the feed-rollers. Beneath the hopper B are two shafts provided with two sets of rollers, *d d*, one set to each division of the hopper, motion being imparted to the same through the medium of the gears E F. The rollers beneath that part of the hopper B intended to drop seed, and the rollers *b b* in the hopper A, are made of rubber or other flexible material, the object of which is to allow the seed or grain to pass between them without crushing or otherwise injuring the seed or grain; and, in planting in drills, as many sets of the rubber rollers and drill-tubes may be used as desired. One set of the rollers beneath the hopper B are wood, to be used when it is desired to drop fertilizers, in which case the fertilizer passing between the wood rollers from one division of the hopper B and the seed passing between the flexible rollers from the other division of the hopper B pass together in the same drill through the drill-tube G′. Attached to and extending forward from the hopper A is a rod, *g*, whose end has an eye fitting over the inclined standard D′ on the draft-pole. As this rod *g* is elevated upon the standard D, the gearing ends of the hoppers are thrown backward, removing the teeth of the gear-wheel E from those of the gear F, which drives the feed-rollers, thus stopping the discharge of seed from the hoppers, and by pressing the eye on the rod *g* down on the standard D′, the meshing of the gears E and F is again produced, and the machine will be again put in operation. Under the hopper B is a plate, *h*, through which passes the end of the shaft *i*, so that when the hopper is thrown backward the end of the shaft *i* is carried rearward in the slot *j* and the band *l* around the pulleys *m* and *n*, thus tightened so as to turn the pulley *n* as indicated by the arrow, thus lifting the drill-tubes G′ and cleaners I by the winding of the chains or cords *p* around the shaft *i*. On the pulley *n* is a stud, *q*, which, after passing the hinged flap *r*, will prevent the return of the shaft *i* until the hopper is removed forward. I represents shovel or drill-tube cleaners, and consists of two bars swinging from the front of the machine, being secured to the tubular bar *i′*, which turns upon the shaft or rod *j′*. The said cleaners are reciprocated by the connection of the rod J with an eccentric upon the main axle of the machine. Each drill-tube or shovel G′ is provided with cleaners I. S represents a brace-bar or lever, with its front end hinged between and supported by the drag-bars S′ S′, as shown. The rear end of the bar S is hinged or jointed to the drill-tube G′ by means of the short link or joint *c*, thus rendering the bar S flexible, and by this means the drill-tube G′ may be moved forward or back, to run deep or shallow, and will yield when meeting an obstruction, as presently described. D represents a chair, which is securely attached to the outsides of the drag-bars S′ S′, and extending upward, the top forming a seat for the spring U. To the brace-rod or lever S a link, *w′*, is pivoted, as shown. To the top of said link a rod or bolt, T, is attached, said rod having screw-threads for the reception of the nuts *v v*, and extending upward through a perforation in the seat of the chair D and through spring U.

By means of the nuts *v v* upon the rod or bolt T, one being under the seat of the chair D and the other on the top of the spring U, the tension of the spring is regulated as well as the position of the short link or joint *c* between the lever or brace-bar S and the top of the drill-tube G′. The short link or joint *c* should have a downward inclination from the point where it is pivoted to the drill-tube G′, for, if this short link or joint *c* were held in line with *g″* and *k*, there would be no tendency in the joint to move downward and thus let the tube G′ pass over obstructions; but every fraction of an inch that the link or joint *c* is held below a straight line with *g″* and *k* gives that much leverage or downward force on the link *c* when force is applied to the lower end of the drill-tube G′.

Should the bar or lever S become bent so as to change the leverage at the joint or link *c*, the nuts *v v* will enable the attendant to set the joint or link *c* at any desired leverage without going to a smith's shop for repairs.

The tension of the spring U is increased by screwing down the upper nut *v*.

The position of the joint or link *c* is regulated by the nut *v* under the seat of the chair, thus giving the required leverage.

The drag-bars S′ S′ are connected to the forward part of the frame of the machine by rod *w*, so as to have a free vertical motion, and are pivoted to the drill-tube at a point below the joint or link *c*, as shown. The chair D is attached to the outside of the drag-bars S′ S′ to keep said bars from spreading in case any unusual strain is brought to bear upon the same.

The spring U shown is a cylinder of vulcanized India rubber; but it is obvious that a spring of other material used for springs would answer the same purpose.

The object of the rubber or other flexible material used for the seed-rollers is to allow the seed to pass between them without crushing or injuring the seed; but, if desired, only one of said elastic or flexible rollers may be used with another roller of inelastic material, provided the one elastic or flexible roller is of sufficient elasticity to prevent the seed from being injured.

Having thus fully described my invention, what I claim, and desire to secure by Letters Patent, is—

1. The flexible or elastic rollers *b b* or *d d*, whether one or both are elastic or flexible, when placed on a horizontal plane to each other in or beneath a hopper, A or B, substantially as and for the purpose set forth.

2. The set of rollers *d d*, in combination with the hopper B and regulating-slide *f*, substantially as specified.

3. The flexible rollers, when arranged with a hopper for the reception of seed, in combination with a drill-tube, G′, substantially as specified.

4. The combination of the elastic or flexible rollers *d d*, hopper B, slide *f*, and drill-tube G, when the several parts are arranged as described and for the purpose set forth.

5. The hopper A, in combination with the elastic rollers *b b*, blocks *c c*, and suitable operative mechanism, as and for the purpose specified.

6. A drill-tube, G′, having the link or joint *c* supporting the brace-rod or lever S pivoted thereto at a point above the point where the drag-bars are pivoted to said tube, when spring-power is applied to the lever S, as and for the purpose set forth.

7. The spring U, in combination with the chair D, rod or bolt T, nuts *v v*, lever S, and link *e*, for the purpose described.

8. The drag-bars S′ S′, lever S, link *c*, tube G′, in combination with a spring, U, substantially as and for the purpose set forth.

9. The chair D supported by the drag-bars S′ S′, in combination with the spring U and lever S, substantially as described, and for the purpose specified.

10. The combination of the lever S, drag-bars S′ S′, links *w′*, rod T, nuts *v v*, and spring U, substantially as and for the purpose set forth.

11. The link or joint *c*, in combination with the tube G′, and lever S, as and for the purpose specified.

12. The combination of the rod *g* with the inclined standard D′, for the purpose of cutting off the discharge of seed and elevating the drill-tubes and cleaners, substantially as described.

J. D. WILLOUGHBY.

Witnesses:
C. H. WATSON,
A. McCALLUM.